United States Patent [19]
Montaron

[11] Patent Number: 5,519,668
[45] Date of Patent: May 21, 1996

[54] METHODS AND DEVICES FOR REAL-TIME FORMATION IMAGING THROUGH MEASUREMENT WHILE DRILLING TELEMETRY

[75] Inventor: Bernard Montaron, Sugar Land, Tex.

[73] Assignee: Schlumberger Technology Corporation, Sugar Land, Tex.

[21] Appl. No.: 249,412

[22] Filed: May 26, 1994

[51] Int. Cl.$^6$ ..................................................... G01V 1/40
[52] U.S. Cl. ................... 367/35; 367/69; 175/45
[58] Field of Search ................... 367/83, 84, 85, 367/81, 69, 35, 911; 175/45, 50; 364/422; 324/356

[56] References Cited

U.S. PATENT DOCUMENTS

| | | | |
|---|---|---|---|
| 4,461,301 | 7/1984 | Ochs | 128/630 |
| 4,509,150 | 4/1985 | Davis | 367/76 |
| 4,567,759 | 2/1986 | Ekstrom et al. | 73/152 |
| 4,646,240 | 2/1987 | Serra et al. | 364/422 |
| 4,715,002 | 12/1987 | Vernon et al. | 364/422 |
| 4,786,874 | 11/1988 | Grosso et al. | 324/369 |
| 4,843,875 | 7/1989 | Kerbart | . |
| 4,873,522 | 10/1989 | Jürgens | 340/853 |
| 4,969,128 | 11/1990 | Dennis et al. | 367/25 |
| 4,999,817 | 3/1991 | Zimmer | 367/65 |
| 5,017,778 | 5/1991 | Wraight | 250/254 |
| 5,031,155 | 7/1991 | Hsu | 367/25 |
| 5,038,378 | 8/1991 | Chen | 382/1 |
| 5,058,078 | 10/1991 | Eyl et al. | . |
| 5,200,705 | 4/1993 | Clark et al. | 324/338 |
| 5,291,137 | 3/1994 | Freedman | . |
| 5,381,092 | 1/1995 | Freedman | . |

Primary Examiner—Michael J. Carone
Assistant Examiner—Christopher K. Montgomery
Attorney, Agent, or Firm—David P. Gordon; Wayne I. Kanak

[57] ABSTRACT

Methods for providing an image at the surface of a formation surrounding a borehole in real-time include associating resistivity measurements with a predetermined number of preselected toolface positions. The resistivity measurements are subjected to data compression and transmitted uphole by MWD telemetry. At the surface, the compressed resistivity measurements are associated with the preselected toolface positions and with a calculated translational distance value. The resistivity measurements are decompressed and/or converted to pixel information. The pixel information is arranged according to toolface position and translational distance to create a high resolution of the formation. These processes are repeated over time so that the image created represents the formation over a selected distance. Apparatus of the invention used to perform the methods include an MWD telemetry device, at least one downhole formation resistivity sensor, and downhole device(s) for determining the toolface of the resistivity sensor. Downhole processor(s) are provided for synchronizing, selecting and compressing resistivity measurements. On the surface, a translational distance sensor is provided along with processor(s) for associating, converting, and arranging. At the surface, the associated information is used to form an image of the formation spanning a number of translational distance values.

47 Claims, 6 Drawing Sheets

METHODS AND DEVICES FOR REAL-TIME FORMATION IMAGING THROUGH MEASUREMENT WHILE DRILLING TELEMETRY

This application is related to the following co-assigned U.S. patent application Ser. No., the complete disclosure of which is hereby incorporated herein by reference: 08/150,944, now abandoned. This application is also related to the following co-assigned U.S. patents, the complete disclosures of which are hereby incorporated herein by reference: U.S. Pat. Nos. 5,249,161; 5,237,540; 5,235,285; 4,899,122; 4,879,463; 4,843,875; 5,448,227; 5,467,832; 5,339,037; and 5,375,098.

BACKGROUND OF THE INVENTION

1. Field of the Invention

This invention relates to the processing of data acquired by a measurement while drilling (MWD) tool during the drilling of a wellbore. More particularly, the invention relates to methods and devices for transmitting to the surface in real-time an image of the formation penetrated by the borehole as the borehole is being drilled using MWD telemetry.

2. State of the Art

Modern well drilling techniques, particularly those concerned with the drilling of oil and gas wells, involve the use of several different measurement and telemetry systems to provide petrophysical data and data regarding drilling mechanics during the drilling process. Data is acquired by sensors located in the drill string near the bit and either stored in downhole memory or transmitted to the surface using MWD telemetry devices. The state of the art in data acquisition and telemetry is well exemplified by the "Integrated Drilling Evaluation and Logging System" (IDEAL, a registered trademark of Schlumberger) developed by Schlumberger/Anadrill, Sugar Land, Texas. The IDEAL system comprises several components which provide useful information regarding downhole conditions at or near the bit while drilling. These components include a GEOSTEERING component which is disclosed in U.S. patent application Ser. Nos. 08/150,932 and 08/150,941, a RAB (resistivity-at-the-bit) component which is disclosed in U.S. patent application Ser. No. 07/955,101 and U.S. Pat. No. 5,235,285, a RWOB (receiver, weight on bit and torque) component which is disclosed in U.S. patent application Ser. No. 08/150,944, a POWERPULSE (MWD) telemetry component which is disclosed in U.S. Pat. Nos. 5,237,540 and 5,249,161 and in U.S. patent application Ser. No. 07/934,137, a CDR (compensated dual resistivity) component which is disclosed in U.S. Pat. No. 4,899,122, a CDN (compensated density neutron) component which is disclosed in U.S. Pat. No. 4,879,463, and an IDEAL Wellsite Information System. In addition, novel procedures for determining the instantaneous depth ("microdepth") and the rate of penetration of the drill bit are disclosed in U.S. Pat. No. 4,843,875.

At the outset, it should be noted that not all of the data acquired downhole is transmitted to the surface using MWD telemetry. MWD telemetry involves the mechanical pulsing of mud surrounding the drill string in the wellbore. Typically, downhole data is transmitted to the surface through mud pulse telemetry at a rate of approximately 1 bit per second. With the POWERPULSE MWD telemetry component, however, a continuous mud wave or "siren-type" telemetry method is used together with design features and software which enable a transmission rate of 6 or more bits per second. The POWERPULSE MWD component is also equipped with sensors which measure magnetic and gravitational fields in three dimensions. The magnetic and gravitational information can then be used to calculate inclination, azimuth, and toolface (instantaneous angular position) of the MWD component and thus the drill string. Since most of the downhole sensing components are capable of acquiring data much faster than can be transmitted by MWD telemetry, the data is typically stored in downhole memory for later downloading when the tool is tripped out of the borehole. Only selected data is transmitted to the surface in real-time for analysis while drilling.

The POWERPULSE MWD component is typically located in the drill string near the bit with the other mentioned components located either above or below it, depending on the particular component. Data acquired by the other components may be transmitted to the POWERPULSE MWD component by means of the RWOB component by wireless telemetry such as electromagnetic telemetry or ultrasonic telemetry. Those skilled in the art will appreciate that electromagnetic telemetry max provide a data transmission rate as high as a few hundred bits per second. Therefore, while efficiency of communication between the various downhole sensors and the MWD component is not as much an issue as the efficiency of communication between the MWD component and the surface, it is nevertheless a limiting factor in gathering real-time data.

Presently, the various components mentioned above acquire data regarding bit displacement including weight, torque, speed, inclination and azimuth, formation resistivities, gamma ray, density, and neutron porosity measurements. Of particular interest to the present invention are the data acquired by the RAB component which includes formation resistivity data. Presently, these data are used to evaluate the formation and for detecting fractures or thin or permeable beds. Azimuthal button electrodes on the RAB component acquire high resolution resistivity data. The resistivity measurements are indicative of the type of formation (mineral and porosity) present around the wellbore, e.g., sand, clay, lignite, montmorillonite, water, bound water, gas, and oil, each of which have a different resistivity. The resistivity data can be converted into image data based on the known resistive properties of formation components to create a color image where each resistivity is assigned a different color. Such an image will visually show the different layers of the formation and thereby aid in directing the drilling towards a hydrocarbon reservoir or in the production of hydrocarbons after the drilling has been completed. It is known to create such images with downloaded data after the tool is tripped out of the borehole. It is also known to create such images in real-time with a "wireline" imaging tool which transmits to the surface by cable. The known real-time imaging is therefore not performed while drilling, but is performed with a special imaging tool after drilling is completed.

Resistivity measurements for imaging are typically made in the range of 0.2–2,000 ohm-meters, i.e. a relative range of $10^4$. It would therefore take at least 13 bits to transmit a single resistivity measurement having a sensitivity of 0.2 ohm-meters. Consequently, it is impractical to transmit more than a few resistivity measurements to the surface using the MWD component. Instead, they are stored in downhole memory for later downloading when the tool is tripped out of the borehole. Some resistivity data can be transmitted to the surface by the MWD component and at the surface to the IDEAL Wellsite Information System which combines the resistivity data with surface data to provide a real-time numeric or chart display (a log) of the formation. While the log of the formation is extremely useful, the resolution of the real-time log is severely limited by the transmission rate of the MWD component.

As mentioned above, the most significant limitation of all real-time measurements in the wellbore is the data transmission rate of the mud pulse telemetry systems. Even with the state of the art 6 or more bits per second transmission rate, however, transmission of real-time formation image data is unthinkable. In order to create such an image, one must associate the toolface (instantaneous angular position of the tool) with the formation resistivity measurements from the RAB component and with the tool depth (actually the translational distance of the tool in the wellbore since the wellbore is not always vertical) at virtually exactly the same time (within a few milliseconds). Although the translational distance of the tool is available at the surface and the toolface and the formation measurements are ultimately available at the surface, they are not available within milliseconds of each other. Therefore, they must be associated downhole before transmission by the MWD component. However, as noted above, communication between the MWD component and the RAB component is at best a few hundred bits per second, not fast enough to associate data from both components within a few milliseconds. Even if the toolface data could be timely associated with the formation measurements and the translational distance data within a few milliseconds, the amount of data needed to define each distance-toolface-resistivity coordinate would be enormous in comparison to the slow transmission rate imposed by the MWD component.

SUMMARY OF THE INVENTION

It is therefore an object of the present invention to provide a downhole method for associating in real-time the toolface of the resistivity measuring tool with formation resistivity measurements.

It is also an object of the invention to provide a method for associating toolface-resistivity coordinates created downhole with instantaneous translational distance data available at the surface to create three dimensional coordinates from which an image of the formation around the borehole can be created.

It is another object of the invention to provide a data encoding and compression scheme so that relatively high resolution toolface-resistivity coordinates can be transmitted in real-time to the surface at a rate of as low as 6 bits per second.

It is a further object of the invention to provide a time synchronization scheme so that downhole data acquired by different sensors can be associated with each other within a few milliseconds.

Another object of the invention is to provide a telemetry data frame for use by the MWD component so that toolface-resistivity coordinates can be transmitted to the surface in real-time along with other downhole data.

Yet another object of the invention is to provide a method for associating formation resistivity measurements with the toolface of the measuring tool when the rotational speed of the measuring tool is not constant.

It is also an object of the invention to provide image resolution enhancement methods for use on the surface with toolface-resistivity coordinates obtained from downhole to provide a relatively high resolution image of the formation around the borehole in real-time.

In accord with these objects which will be discussed in detail below, the methods for providing an image at the surface of a formation in real-time include first associating resistivity measurements with a predetermined number of preselected toolface positions. This is accomplished in different ways depending on whether the toolface component and resistivity component must communicate by telemetry or whether they are "hard-wired" together. When toolface and resistivity components are hard-wired together, the resistivity component records a resistivity measurement every time the toolface component indicates one of a number of preselected positions. When the toolface and resistivity components communicate by telemetry, a synchronizing signal is sent by the toolface component to the resistivity component and both components record measurements against time at a synchronized rate for a specified period. The (time, resistivity) coordinates from the resistivity component are transmitted to the toolface component where they are compared to the (time, toolface) coordinates and a predetermined number of resistivity measurements are selected as representing the formation at specified toolface positions. The selected resistivity measurements are then subjected to data compression and transmitted uphole by mud pulse telemetry. At the surface, the compressed resistivity measurements are associated with the predetermined toolface positions and with a calculated translational distance value representing the translational distance from the surface in the borehole at which the resistivity measurements were made. The resistivity measurements are then decompressed and/or converted to pixel information. In this context, "pixel information" means a single picture element, not a single pixel of a video display. Each "pixel" in this context is typically a monochrome tile representing typically a 2×2 inch area. When displayed on a typical video display, each tile may be represented by thousands of video display pixels. The pixel information is arranged according to toolface position and translational distance to thereby create a high resolution image of the formation surrounding the borehole. These processes are repeated over time so that the image created represents the formation over a selected distance.

The devices of the invention used to perform the methods disclosed herein include an MWD telemetry device, at least one downhole formation resistivity sensor, and downhole means for determining the toolface of the resistivity sensor. Downhole processor means are provided for synchronizing toolface and resistivity measurements. The toolface and resistivity measurements are stored in downhole memory prior to selection, compression and transmission of the resistivity measurements. Downhole processing means are provided for selecting and compressing resistivity measurements. On the surface, means for determining the translational distance of the resistivity sensor over time are provided along with processing means for associating the translational distance of the resistivity sensor with the compressed resistivity measurements transmitted by the MWD telemetry device and with the predetermined toolface positions. Surface processing means for converting the compressed resistivity measurements to pixel information and arranging the pixel information according to the associated translational distance and toolface information are also provided. Imaging means at the surface uses the associated information to form an image of the formation spanning a plurality of translational distance values.

A preferred method according to the invention includes selecting a minimum number of resistivity measurements to be made within one revolution of the drill string. Resistivity measurements are synchronized with at least one toolface position and resistivity measurements and toolface measurements are recorded at a rate which insures that the selected minimum number of resistivity measurements to be made within one revolution of the drill string will be made regardless of the rotational speed of the drill string. Resistivity measurements are compressed by selecting a plurality of numbered resistivity scales, each of which have a plurality of numbered resistivity value ranges. The resistivity measurements made during one or more revolutions of the drill string are analyzed and an appropriate resistivity scale is chosen to represent the resistivities measured during the one or more revolutions of the drill string. The selected minimum number of resistivity measurements made during the one or more revolutions of the drill string are converted to an appropriate value range number taken from the selected scale. The selected scale number followed by the selected range numbers are transmitted to the surface according to a data frame which allows other downhole data to be transmitted as well. The scale number and range numbers received at the surface are associated at the surface with surface calculated translational distance data and converted to pixel information. The pixel information is arranged from left to right according to the preselected toolface positions and from top to bottom according to translational distance values. Optionally, the scale and range numbers may be associated with the resistivities to which they were originally assigned to create a high resolution real-time image of the formation.

Preferred apparatus for performing the method according to the invention include: means for synchronizing and timing resistivity and toolface measurements; memory means for storing (toolface, time) coordinates and (resistivity, time) coordinates; a processor means coupled to the memory means for selecting and/or interpolating a predetermined number of resistivity measurements from the memory means, each selected resistivity measurement being associated with a predetermined toolface position; and downhole data compression means for compressing the selected resistivity measurements according to a scale and range table stored in downhole memory. An MWD telemetry device transmits scale and range values to the surface. Means for determining the translational position of the resistivity sensor is provided at the surface together with means for associating the translational positions with scale and range values received at the surface.

Additional objects and advantages of the invention will become apparent to those skilled in the art upon reference to the detailed description taken in conjunction with the provided figures.

BRIEF DESCRIPTION OF THE DRAWINGS

FIG. 5 is a diagram illustrating an image prior to resolution enhancement;

FIG. 5a is a diagram illustrating one image resolution enhancement method; and

FIG. 5b is a diagram illustrating another image resolution enhancement method.

DETAILED DESCRIPTION OF THE PREFERRED EMBODIMENTS

1. Downhole Data Acquisition and Telemetry Hardware

Figure 1:
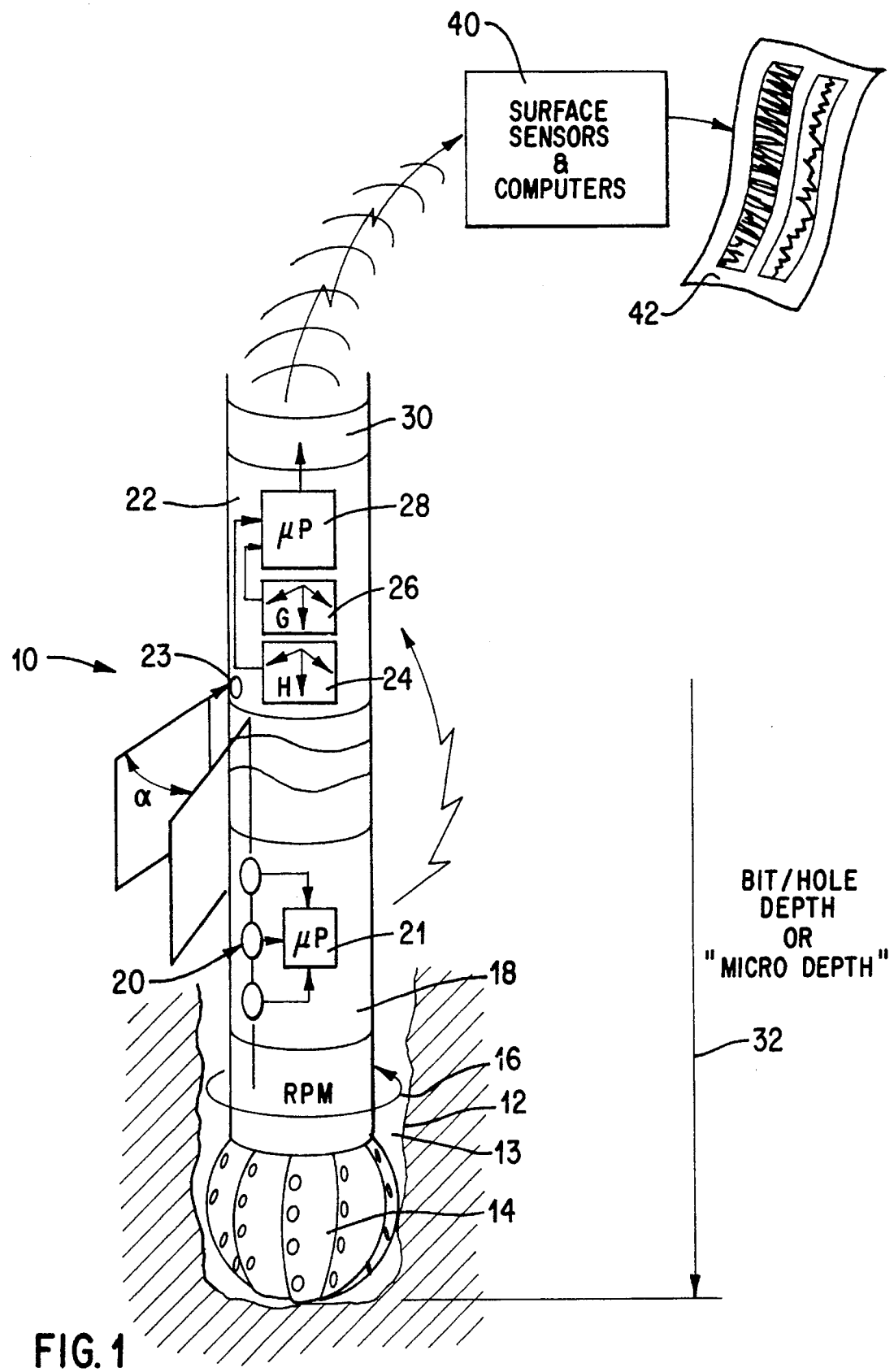
FIG. 1 is a schematic diagram of a drill string containing devices for acquiring, processing and transmitting data to create an image of the formation around the borehole in real-time according to the invention.

FIG. 1 shows a schematic illustration of one possible embodiment of a drill string 10 containing devices for acquiring and transmitting data for constructing a real-time image of the formation surrounding the borehole according to the invention. The drill string 10 penetrates the formation 12 as the drill bit 14 rotates in the direction shown by the arrow 16. Although it is possible to rotate the drill bit 14 without also rotating the drill string 10, for purposes of the present invention, it is the rotation of the drill string 10 which is important. As the drill string 10 rotates, several components located above the bit 14 take measurements regarding the formation 12 around the borehole 13 and the angular position of the drill string 10. In particular, a resistivity sensor 18 is provided with one or more resistivity buttons 20 which measure the resistivity of the formation 12 at the point where the button 20 faces the wall of the borehole 13. According to one embodiment of the invention, the resistivity button 20 is coupled to a processor 21 for processing resistivity measurements as will be described in more detail below. In addition to the resistivity sensor 18, a position sensor 22 is provided with a magnetic field sensor (three axis magnetometer) 24 and a gravity sensor (three axis accelerometer) 26, both of which are coupled to a processor 28. As known in the art, the processor 28 combines three-dimensional magnetic and gravitational data from the magnetic field sensor 24 and gravity sensor 26 to provide toolface data. As mentioned above, the toolface is the instantaneous angular position of a point (e.g. the slick pin 23) on the surface of the drill string as the drill string rotates. Thus, in one rotation of the drill string, the toolface will change from 0 to 360 degrees and then repeat this scale during the next rotation of the drill string. In accordance with the invention, the drill string 10 is also provided with a mud pulse telemetry component 30 for transmitting data uphole to processors 40 at the surface for creating images and logs 42 as will be described in detail below. As the drill string 10 rotates, the resistivity button 20 on the resistivity sensor 18 is capable of taking many rapid measurements of the resistivity of the formation 12 around the borehole 13. The resistivity measurements are indicative of the type of formation (mineral and porosity) present around the wellbore, e.g., sand, clay, lignite, montmorillonite, water, bound water, gas, oil, etc., each of which have a different resistivity, typically in the range of 0.2 to 2,000 ohm-meters. As shown in FIG. 1, the resistivity sensor 18 is fixed relative to the position sensor 22 so that both sensors rotate together. The resistivity button 20 is angularly offset from the slick pin 23 by a known angle [alpha] so that by knowing the toolface of the slick pin 23, the toolface of the resistivity button 20 is also known. The depth 32 of the resistivity sensor 18 is computed at the surface using methods such as those taught in U.S. Pat. No. 4,843,875.

2. Foundation of the Methods of the Invention

According to the methods of the present invention, the resistivity measurements and toolface data obtained by the above-described components in the drill string are combined, compressed, and transmitted to the surface in real-time. At the surface, the toolface-resistivity data are decompressed and associated with translational distance data to produce a high resolution resistivity map which is used to form an image of the formation around the borehole.

The methods of the present invention stem from several acute observations regarding the nature of formations and the way in which a drill string penetrates a formation. It is first observed that the drill string penetrates the formation at a typical rate of about 60 feet per hour with a rotational speed of from 30–180 RPM. It is also observed that the nature of the formation often remains relatively constant for long distances before changing at a boundary. Combining these observations, it can be realized that an image of the formation around the borehole will be characterized by a significant amount of redundancy and that there is more than sufficient time during penetration of the formation to obtain sufficient resistivity data to create a relatively high resolution image of the formation.

3. Amount of Data Required to Form an Image of the Formation

Those skilled in the art of imaging will appreciate that all images are constructed from a plurality of pixels, and that the density of pixels affects the image resolution. Specifically, the greater number of pixels per unit area, the higher the resolution will be. In addition, those skilled in the art will appreciate that the range of the pixels will greatly influence the resolution of the resulting image. Pixel range is defined as the number of different values any pixel may assume. For example, given identical pixel densities, pixels which may assume sixteen different values (4-bit pixels) will provide a much higher resolution image than pixels which may assume only eight different values (3-bit pixels). In constructing an image of the formation around the borehole, resistivity data is used to determine the value of pixels and the pixels must be arranged according to the position in the borehole where their respective resistivity data was acquired. Therefore, it is necessary to associate each resistivity measurement with the translational and rotational position in the borehole where the resistivity measurement is made.

Figure 2:
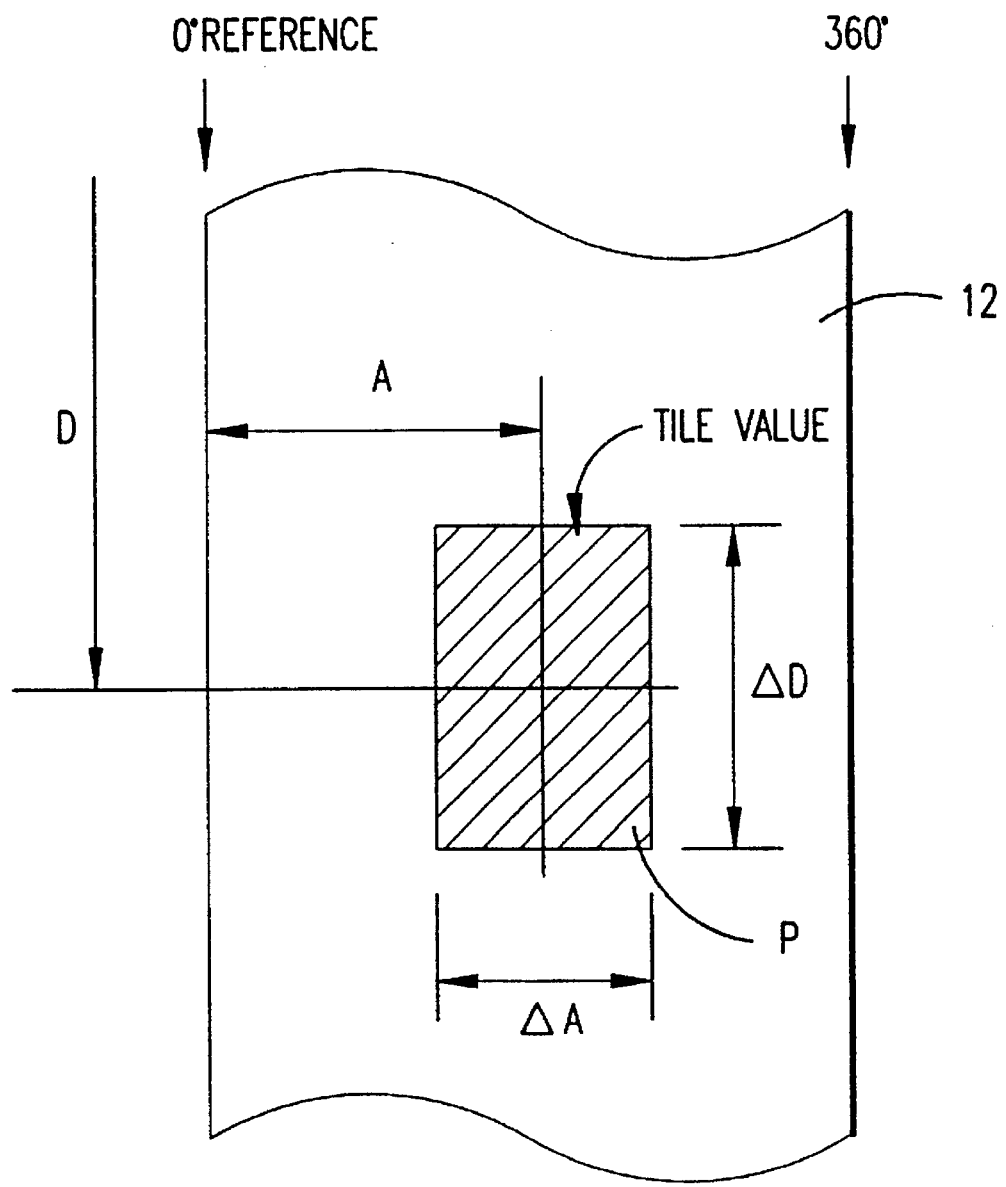
FIG. 2 is a schematic diagram illustrating the parameters needed to create a single picture element for forming an image of the formation around the borehole.

Turning now to FIG. 2, the formation 12, traversed by a cylindrical borehole, is imaged as a plane having a vertical dimension D and a horizontal dimension of 360 degrees. A single pixel P (resistivity measurement) forming part of an image of the formation around the borehole is located by its translational distance D from the surface and its angular position A inside the borehole. The vertical size of the pixel P is indicated by $\Delta D$ and the horizontal size of the pixel P is indicated by $\Delta A$. In other words, as the drill string rotates and penetrates the formation, pixels (resistivity measurements) will be acquired rotationally and translationally in order to assemble an image of the formation surrounding the borehole. If, for example, the borehole has a circumference of 24 inches, is penetrated at 60 feet per hour with a drill string rotating at 60 RPM, and pixels (resistivity measurements) representing 2 inches by 2 inches are required to form a high resolution image of the formation, the following conclusions can be made. First, as the drill string rotates, twelve pixels (resistivity measurements) will be acquired during a single rotation with each pixel representing an angular width of thirty degrees. Second, as the drill string penetrates the formation, ten seconds will elapse before the translational distance of the drill string is increased by two inches. Considering the relative homogeneity of the formation, there is little change expected in a 2×2 inch area so that a resistivity measurement made anywhere within that 2×2 inch area should be valid for the entire 2×2 inch area. Although the resistivity sensor in the drill string actually traverses the formation in a spiral path, the accumulation of pixels can be considered as comprising cylindrical layers or orthogonal slices about the wellbore. The homogeneity of the formation and the relatively slow penetration rate as compared to the rate of drill string rotation permits this approximation.

According to the above example, the number of resistivity measurements used to create an image of the formation around the borehole is twelve measurements every ten seconds or every two translational inches through the formation. In order to transmit these resistivity measurements to the surface in real-time, 1.2 measurements must be transmitted each second. At a maximum transmission rate of ten bits per second, each resistivity measurement, together with its associated toolface position, must be expressed in at most eight bits. As there will be twelve toolface positions, four bits would be required to express the positions, leaving only four bits for expressing the resistivity measurement. This poses a problem in that resistivity measurements span a range of 0.2 to 2,000 ohms-meters. In addition, while the telemetry rate may be as high as ten bits per second, other downhole data must also be transmitted to the surface during drilling. As a practical matter, the effective transmission rate for transmitting resistivity measurements and associated toolface positions may be only six bits per second. At this rate, the number of bits available for expressing each resistivity measurement would be only two.

4. Data Compression

According to one of the methods of the invention, resistivity measurements are synchronized with predetermined toolface positions so that only resistivity measurements need to be transmitted to the surface. Several different synchronization techniques may be used as described in more detail below. Moreover, in order to transmit resistivity measurements of the highest possible resolution, resistivity measurements are compressed according to a system of scales and ranges. For example, if resistivity measurements vary between 0.2 and 2,000 ohm-meters, a scale and range table may be defined as follows:

| Resistivity Range (ohm-meters) | Scale Number | Range Number |
|---|---|---|
| 0.2–0.3 | 1 | 1 |
| 0.3–0.5 | 1 | 2 |
| 0.5–0.8 | 1 | 3 |
| 0.8–1.3 | 1 | 4 |
| 1.3–2.0 | 1 | 5 |
| 2.0–20 | 1 | 6 |
| 20–200 | 1 | 7 |
| 200–2000 | 1 | 8 |
| 0.2–2.0 | 2 | 1 |
| 2.0–3.0 | 2 | 2 |
| 3.0–5.0 | 2 | 3 |
| 5.0–8.0 | 2 | 4 |
| 8.0–13 | 2 | 5 |
| 13–20 | 2 | 6 |
| 20–200 | 2 | 7 |
| 200–2000 | 2 | 8 |
| 0.2–2.0 | 3 | 1 |
| 2.0–20 | 3 | 2 |
| 20–30 | 3 | 3 |
| 30–50 | 3 | 4 |
| 50–80 | 3 | 5 |

| Resistivity Range (ohm–meters) | Scale Number | Range Number |
| --- | --- | --- |
| 80–130 | 3 | 6 |
| 130–200 | 3 | 7 |
| 200–2000 | 3 | 8 |
| 0.2–2.0 | 4 | 1 |
| 2.0–20 | 4 | 2 |
| 20–200 | 4 | 3 |
| 200–300 | 4 | 4 |
| 300–500 | 4 | 5 |
| 500–800 | 4 | 6 |
| 800–1300 | 4 | 7 |
| 1300–2000 | 4 | 8 |

In this example, it will be seen that the first scale is more sensitive to values between 0.2 and 2.0 ohm-meters. The second scale is more sensitive to values between 2.0 and 20 ohm-meters. The third scale is more sensitive to values between 20 and 200 ohm-meters. The fourth scale is more sensitive to values between 200 and 2,000 ohm-meters. As mentioned above, since each measured layer of the formation (e.g. two inches) is relatively homogeneous, only one scale will be needed to express the twelve resistivity measurements made for a particular measured layer. Moreover, since the homogeneity of the formation spans several measured layers, a single resistivity scale can be used in expressing the resistivity for several measured layers. Thus, in transmitting resistivity data to the surface using the scale and range compression technique, a scale number is transmitted first and then followed by range numbers for each resistivity measurement over several measured layers of the formation. In this particular example, therefore, it would be possible to transmit four measured layers of resistivity measurements in a total of 146 bits (two bits to indicate the scale used and three bits to indicate the range value for each of the forty-eight resistivity measurements made). It will be recalled that in this example, four measured layers of the formation will be traversed by the drill string in forty seconds. Even with a transmission rate of only six bits per second, there is more than enough time to transmit the 146 bits needed to image the four layers traversed in real-time over forty seconds.

Those skilled in the art will appreciate that the resolution of the formation image can be increased substantially by providing eight scales, each having sixteen ranges. In such case, three bits are needed to transmit the scale number and four bits are needed to transmit each resistivity measurement. Thus, the forty-eight measurements used to image four layers of the formation can be transmitted in 195 bits which is still well within the 240 bit limit (6 bps in forty seconds) imposed by this example. The other forty-five bits available in real-time can be used to transmit other downhole data which may be necessary for the drilling process.

It will be appreciated that prior to transmitting scale and range data uphole, the resistivity measurements are stored and analyzed to determine which scale(s) will be used. Different algorithms may be applied to determine which scale(s) are most appropriate for expressing the resistivity data accumulated. Moreover, the number of resistivity measurements transmitted under a single scale number may be variable or fixed. In a simple embodiment, a fixed number of resistivity measurements will always be expressed using a single scale and those measurements will be analyzed to determine which scale is most suitable for expressing them. A second scale will be chosen only after a fixed number of resistivity measurements have been expressed using the first scale. In another embodiment, minimum and maximum resistivity measurements are constantly monitored and a new scale is selected whenever deemed appropriate.

A scale S may be created as a function of maximum and minimum resistivities from the previous layer, e.g. $S=f(R_{Min}, R_{Max})$. An appropriate transform is then used to compress the resistivity values, e.g. Range=g (S,R), where Range is the compressed resistivity, g is the appropriate transform, S is the scale factor and R is the resistivity to compress. Another way of expressing this is: Range=h $(R_{Min}, R_{Max}, R)$, where h is an appropriate compression algorithm with a variable scale depending on the value $R_{Min}$ and $R_{Max}$ from the previous layer.

5. Synchronizing Toolface and Resistivity

Figure 1A:
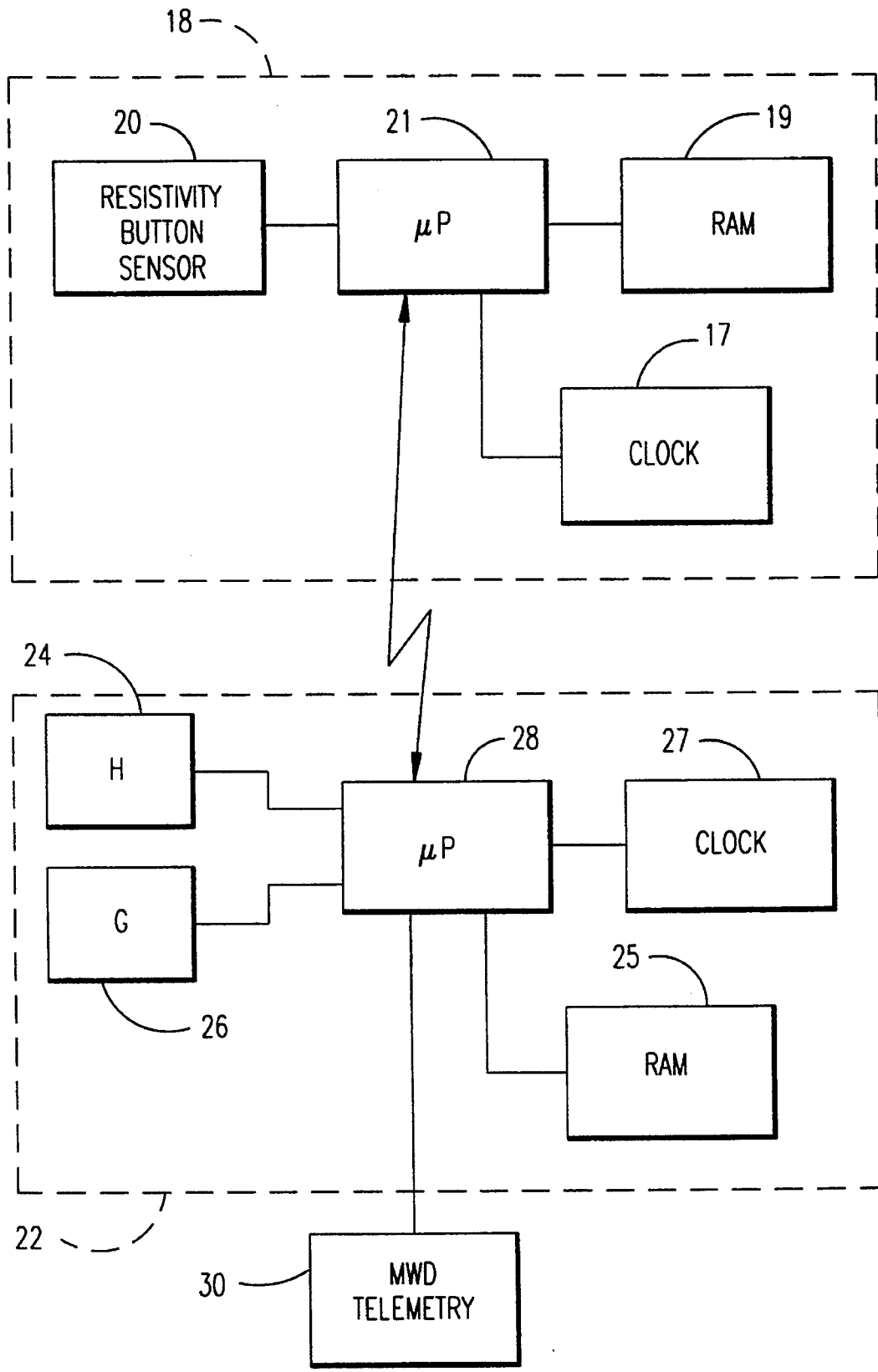
FIG. 1a is a schematic block diagram of the downhole data processing equipment.

As mentioned briefly above, according to one aspect of the invention, resistivity measurements are synchronized with predetermined toolface positions and transmitted to the surface in the sequence that they were made. As shown in FIG. 1a, the resistivity sensor 18 is provided with a button sensor 20, a processor 21, a synchronizing clock 17, and a memory 19. The position sensor 22 is provided with a magnetic field sensor 24, a gravity sensor 26, a processor 28, a memory 25, and a synchronizing clock 27. In the example given above, a resistivity measurement will be made every thirty degrees during a measurement rotation and stored in memory 19. The measurements are processed by processor 21 according to the compression scheme described above and ultimately transmitted to the surface in sequence according to their predetermined toolface positions of 30, 60, 90, 120, 150, 180 degrees, etc. In order to synchronize the resistivity measurements with the toolface positions, the toolface measuring device and the resistivity measuring device must communicate in some way. Communication is straightforward when the toolface measuring device and resistivity measuring device are parts of the same component and can communicate through a direct electrical connection between their respective processors 21, 28. In such a case, resistivity measurements will be recorded to memory 19 by processor 21 every time the toolface is one of the predetermined values as indicated by processor 28. Communication is more problematic, however, when the toolface measuring device 22 and the resistivity sensor 18 are located in different components in the drill string. As mentioned above, different components in the drill string can communicate through electromagnetic telemetry at a maximum rate of a few hundred bits per second. The problem of synchronizing the data from separate components is made even more difficult because the rate at which the drill string rotates is not constant and can vary significantly even during a single revolution, often by as much as fifty percent. It will be appreciated that when the drill string rotates at 180 RPM, resistivity measurements must be taken much faster than when the drill string rotates at only 30 RPM, for example.

The present invention provides several methods for synchronizing separate resistivity and toolface components and to account for broad variations in the rotational speed of the drill string. According to one method, the resistivity sensor 18 waits for a synchronizing pulse from the toolface component 22 and begins recording resistivity measurements in memory 19 at a constant predetermined rate controlled by its synchronizing clock 17. Since the time lag between the sending of the synchronizing pulse by the toolface component 22 and the reception of the pulse by the resistivity sensor 18 is known, the offset between the toolface and the resistivity measurements can be corrected. The constant rate of resistivity measurements is predetermined by the highest possible rotational speed of the drill string. For example, if resistivity measurements are to be taken every thirty degrees of toolface position, twelve measurements are needed. At 30 RPM (two seconds per revolution), a resistivity measurement must be recorded every 0.166 seconds. At 180 RPM (0.33 seconds per revolution), a resistivity measurement must be taken every 0.0277 seconds. In order to compensate for rotational speed fluctuations, the resistivity sensor 18 always records measurements at the highest rate of one every 0.0277 seconds. Thus, at the highest RPM, twelve measurements will be recorded between synchronizing pulses from the toolface component 22 and at the slowest RPM, seventy-two measurements will be recorded between synchronizing pulses from the toolface component 22. Since only twelve equally spaced measurements are needed, when the number of measurements exceeds twelve, twelve measurements are interpolated from them. For example, in the case of seventy-two measurements, every sixth measurement might be used. In the case of twenty-four measurements (60 RPM), every other measurement might be used. Moreover, as rotational speed may vary within a single revolution, the resistivity measurements recorded may not be equally spaced according to their respective toolface positions. In such a case, equally spaced resistivity measurements can be interpolated from the unequally spaced recorded measurements. From the foregoing, it will be appreciated that the rate of measurement is related to the maximum speed of rotation of the toolface and the duration of measurement is related to the minimum speed of rotation. Thus, in the above example, resistivity measurements are taken at the rate of one every 0.0277 seconds for two seconds.

According to an alternative method for synchronizing toolface and resistivity, the toolface component clock 27 is periodically synchronized with the resistivity sensor clock 17. Toolface positions are recorded in memory 25 against time while resistivity measurements are also recorded against time in memory 19. The time coordinates of the toolface measurements are then matched with the time coordinates of the resistivity measurements and the twelve equally spaced resistivity measurements are thus chosen by processor 21.

It will be appreciated, therefore that prior to transmission uphole, the toolface data and resistivity data are processed downhole to provide a predetermined number (in the above example, twelve) of resistivity measurements for each measured layer of the formation to be imaged. The resistivity measurements are then processed according to the scale and range compression scheme described above and the scale and range numbers are transmitted uphole by the MWD telemetry component 30. According to the embodiment shown in FIG. 1a, processors 21 and 28 participate in the above-described downhole processing of resistivity measurements. Those skilled in the art will appreciate, however, that fewer or additional processors and/or memory may be desirable in the performance of the methods described thus far.

6. Telemetry Data Frame

As mentioned above, the POWERPULSE MWD component is capable of transmitting six or more bits per second. It has also been stated herein that in addition to the resistivity data to be transmitted in real-time for imaging the formation, other downhole data must be transmitted uphole in real-time in order to provide an efficient drilling operations. These other data might include, for example, downhole weight on bit, downhole torque, three axes of the gravity field and three axes of the magnetic field. In actual practice, there are several hundred downhole measurements which can be made. Typically, however, between five and ten other measurements will be transmitted along with resistivity image data in real-time. According to the examples given above, between 146 and 195 out of every 240 bits transmitted will be devoted to real-time resistivity data. This leaves 45–94 bits available for other data.

According to another of the methods of the invention, a telemetry data frame is provided to multiplex resistivity data with other downhole data for transmission to the surface. For example, where 195 out of 240 bits are reserved for resistivity data, a possible data frame is represented below where [SYNCSOF] represents a 9-bit start-of-frame signal, SCA represents a 3-bit scale number, RN01 through RN12 represent twelve 4-bit range values expressing the twelve resistivities taken at thirty degree intervals of the first measured layer of the formation, RN13 through RN24 represent values for the second measured layer, etc., and where each "-" represents other data.

[SYNCSOF]---SCA--RN01RN02RN03-RN04RN05RN06-RN07RN08RN09-RN10
RN11RN12-----RN13RN14RN15-RN16RN17RN18-RN19RN20RN21-RN22RN23
RN24-----RN25RN26RN27-RN28RN29RN30-RN31RN32RN33-RN34RN35RN36
-----RN37RN38RN39-RM40RN41RN42-RN43RN44RN45-RN46RN47RN48----

Those skilled in the art will appreciate that many other data frames are possible. The 240-bit data frame shown here is suitable for the examples given above where one of eight scales each having sixteen ranges will be used to compress forty-eight resistivity values representing four measured layers of formation. At a transmission rate of 6 bps, this 240-bit frame can be transmitted in forty seconds during which time, resistivity values for the next four measured layers of the formation will be recorded, synchronized with toolface data, and compressed according to an appropriate scale. As mentioned above, with a typical penetration rate of one foot per minute, data for two inch measured layers will be accumulated at the rate of six measured layers per minute. At this rate, four measured layers of data will be accumulated in the exact same amount of time during which a previous four measured layers were transmitted to the surface, making the transmission "real-time". It will be recalled, however, that it is possible to transmit data uphole at rates greater than 6 bps. In that case, the sample data frame above, can be expanded to include even more data. Alternatively, additional scale values can be added to the frame, or the resolution of the resistivity measurements can be even further enhanced.

7. Timing Considerations

Figure 3:
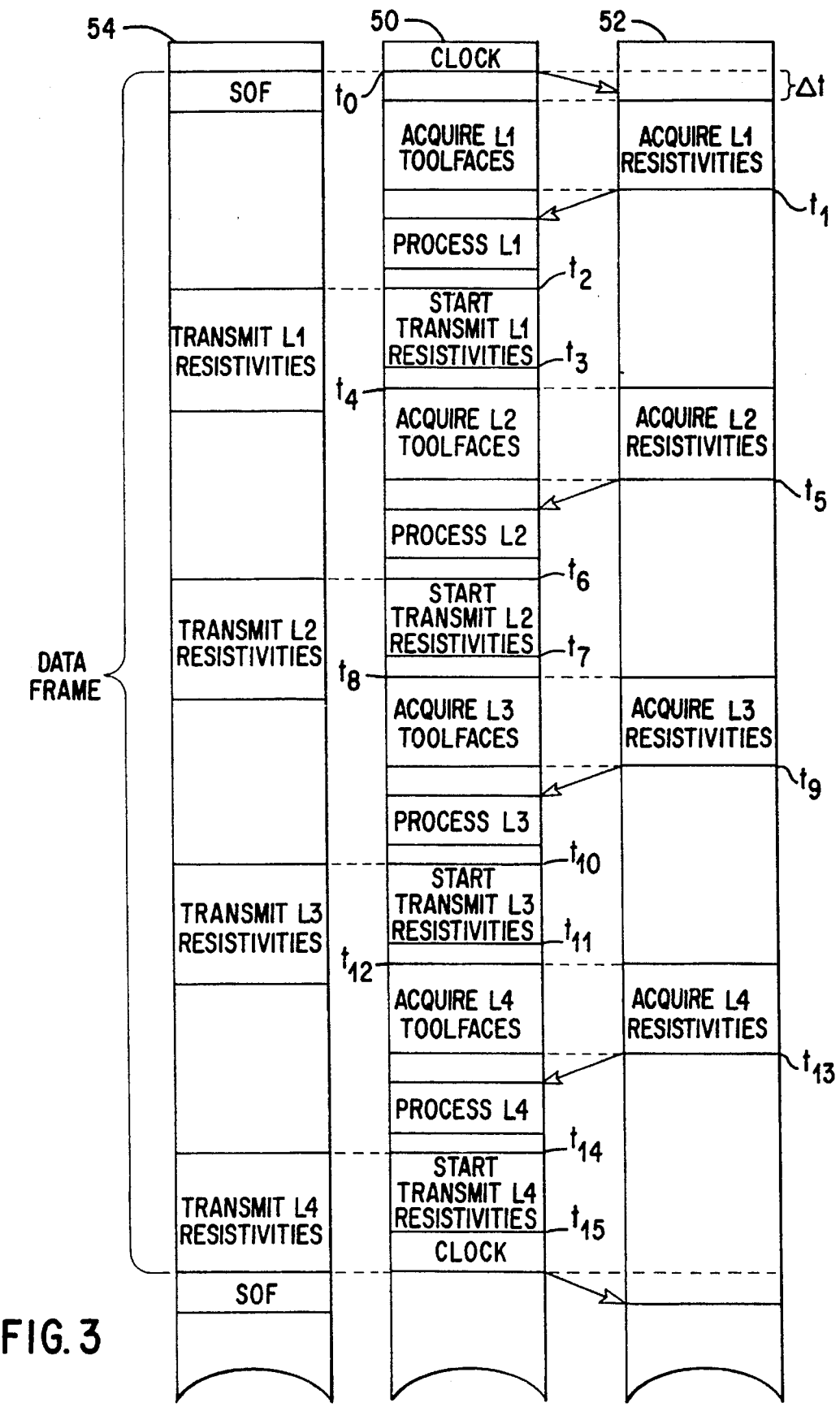
FIG. 3 is a timing diagram of downhole data acquisition, processing and transmission uphole according to the methods of the invention.

In order to accumulate, process, compress and transmit data in a timely manner, the transmission of the telemetry data frame must be synchronized with the accumulation, processing and compression of data. FIG. 3 shows one method by which these operations may be coordinated so that data is transmitted in a timely manner. In this example, the toolface measuring device and the MWD telemetry device are located in the same component of the drill string and communication between them is virtually instantaneous. The resistivity measuring device is located in a separate component of the drill string and communication between it and the other components is via electromagnetic telemetry. Moreover, the method depicted in FIG. 3 relates to the toolface-resistivity synchronizing method described above where a clock synchronizing signal is periodically sent from the toolface component to the resistivity component. As shown in FIG. 3, the center column 50 indicates the sequence of operations in time by the toolface-telemetry component. The right column 52 shows the sequence of operations in time by the resistivity component. The left column 54 shows the timing of the telemetry data frame.

It will be appreciated that before any data transmission can begin, data must first be acquired, processed and compressed. Accordingly, data transmission will be slightly offset in time from data accumulation, processing and compression even though data is transmitted at least as fast as it is accumulated. Turning now to FIG. 3, a first clock synchronization pulse is sent at to from the toolface-telemetry component to the resistivity component by electromagnetic telemetry. The resistivity component receives the synchronizing pulse and, at time to+$\Delta$t where $\Delta$t is a predefined time, begins recording one measured layer of resistivity measurements. According to the example given above, the resistivity component will record a resistivity measurement once every 0.0277 seconds for two seconds yielding a total of seventy-two measurements. Depending on the speed of rotation, this may represent from 1 to 6 revolutions of the drill string.

Simultaneously, the toolface component will start recording, at time $t_0+\Delta t$, seventy-two toolface positions at the same rate for two seconds. After recording seventy-two resistivity measurements, the resistivity component transmits the seventy-two measurements to the toolface-telemetry component at time $t_1$ where $t_1=t_0+\Delta t+2$ seconds. These measurements are received by the toolface-telemetry component through electromagnetic telemetry. Thereafter, the seventy-two resistivity measurements are compared to the seventy-two toolface measurements and twelve resistivity measurements at predetermined toolface positions representing one measured layer of the formation are selected. The twelve selected resistivity measurements are then subjected to the scale/range compression method described above. It is only now, at time $t_2$, that transmission of resistivity data may commence.

It should be noted that, in the meantime, the telemetry data frame has been initialized with the original synchronizing pulse at $t_0$ and a synch word SOF has been transmitted uphole by the MWD telemetry component to signal the start of a data frame. In this regard, it will be appreciated that the time from $t_0$ to $t_2$ is predetermined so that after the synchronizing pulse at $t_0$, all of the various components rely on their respective synchronized clocks to accomplish their respective tasks at the appropriate times. Between time $t_2$ and a time not exceeding $t_6$, the scale number and the twelve resistivity measurements from the first layer measured are transmitted by the MWD telemetry component according to the data frame described above. In this regard, it should also be noted that between times $t_0$ and $t_2$, other downhole data is transmitted according to the data frame. The microprocessor downhole is programmed to transmit the data frame according to a precise timing which is perfectly synchronized with the tasks described in FIG. 3. Data received at the surface are time "stamped" at reception. The time "stamps" on the resistivity data are "shifted" to compensate for the difference between acquisition time and transmission time. The depth data are processed at the surface and associated with the resistivity data. The processing of depth data may be accomplished using the methods described in U.S. Pat. No. 4,843,875 which has been cited herein above.

According to the data frame, the scale number and first twelve resistivity measurements will be transmitted between times $t_2$ and a time not exceeding $t_6$. At time $t_4$, the synchronized clocks of the toolface-telemetry component and the resistivity component signal these components to again make seventy-two measurements of resistivity and toolface in two seconds ending at time $t_5$. The second measured layer resistivity measurements are transmitted to the toolface-telemetry tool where they are processed and transmission is started at $t_6$ as described above. Acquisition, processing and transmission proceeds according to this schedule from $t_7$ through $t_{15}$ until the data frame is completed (four layers in forty seconds according to the example above). A next data frame commences with a next clock synchronizing signal at $t_{15}$. Those skilled in the art will appreciate that the vertical resolution of the image will vary according to the rate of penetration. Therefore, the telemetry frame should be adjusted for the anticipated rate of penetration when preparing the tool for a job.

8. Uphole Reception and Image Construction

As mentioned above, the data transmitted from downhole is indicative of resistivities at predetermined toolface positions for consecutive measured layers of the formation. The data is transmitted in real time, with a known time delay as explained above with reference to FIG. 3. This data needs to be associated with translational distance data in order to have the three dimensions necessary to form an image of the formation around the borehole.

Figure 4:
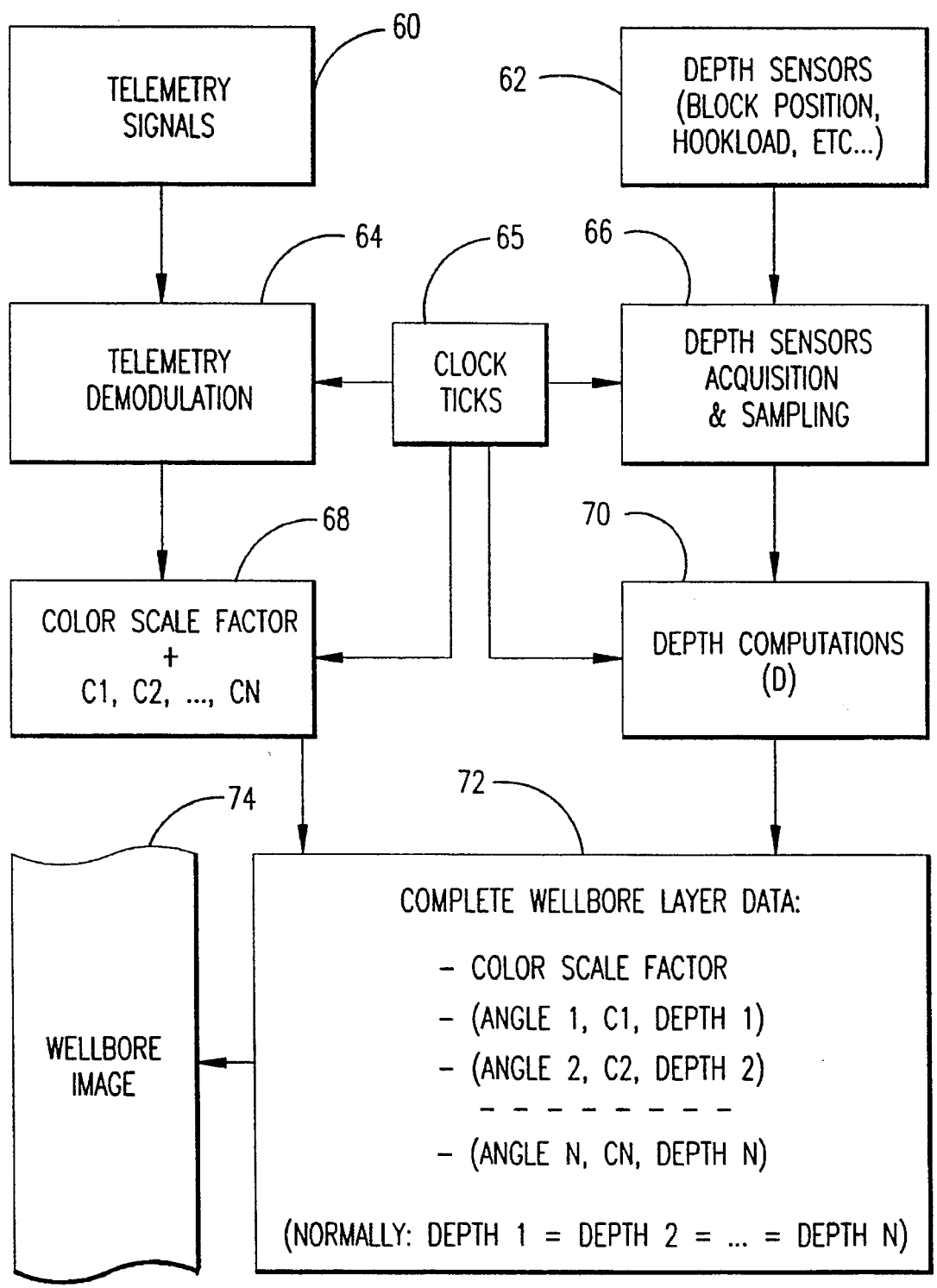
FIG. 4 is a schematic block diagram of uphole reception and processing devices used to create an image of the formation around the borehole in real-time according to the invention.

FIG. 4 shows a schematic block diagram of the uphole data reception and processing. Telemetry signals 60 received from the downhole MWD component are demodulated at 64 while at the same time uphole depth (translational distance) sensors 62 provide translational distance values both of which are synchronized by clock 65. The demodulated telemetry signals are converted to their original resistivity scale and resistivity range values at 68 and translational distance values corresponding to each resistivity range value are provided at 70. The scale value, the resistivity ranges and the translational distance values are combined at 72 with the predetermined toolface positions to provide coordinates corresponding to an image of the formation surrounding the borehole. A color imaging device 74 is preferably driven by assigning a color to each resistivity scale, resistivity range. Thereby, color pixels are arranged in order, as mentioned above, from left to right according to toolface position and from top to bottom according to translational distance.

9. Image Enhancement

Figures 5, 5A, 5B:
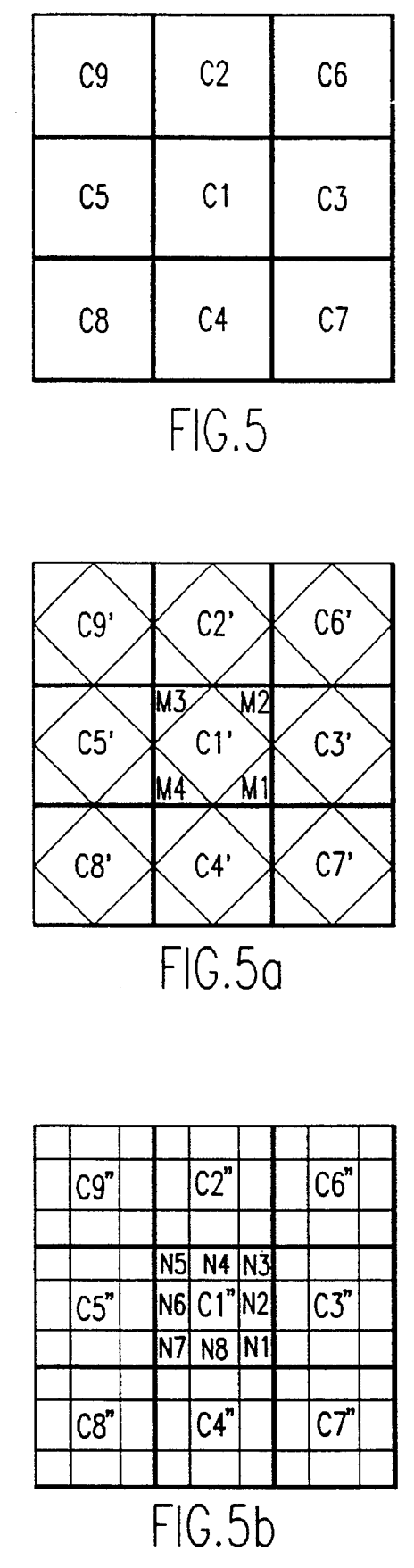

The processes and apparatus described above provide a relatively high resolution color image of the formation in real-time. The resolution of this image may be enhanced even further by using various image enhancement algorithms. For example, as shown in FIGS. 5, 5a and 5b, the resolution of an image consisting of pixels can be enhanced in several ways. FIG. 5 shows an unenhanced image consisting of nine square pixels, each pixel having a different color C1 through C9. The number and range of the pixels in this image can be increased by blending adjacent pixels to form new pixels having new colors.

According to the enhancement method shown in FIG. 5a, each of the nine square pixels C1–C9 is divided into five portions: a central diamond shaped portion and four surrounding triangular shaped portions. For example, pixel C1 is divided into portions C1' and M1–M4 Central pixel C1' remains the same color as pixel C1. The surrounding triangular pixels are assigned color values based on the colors of adjacent original pixels. Pixel M1, for example is assigned a new color based on an average of the colors of pixels C1, C3, C4, and C7. Similarly, pixel M2= (C1+C2+C3+C6)/4. It will be appreciated that following this method, every four adjacent triangular pixels will be assigned the same color and join to form diamond shaped pixels. The resulting enhanced image will consist of twice as many pixels.

Another enhancement method is shown in FIG. 5b. Here, each of the nine original square pixels is divided into nine parts: a central square pixel, e.g. C1", four laterally surrounding rectangular pixels, e.g. N2, N4, N6, and N8, and four corner square pixels, e.g. N1, N3, N5, N7. Colors are assigned to newly formed pixels by averaging from adjacent original pixels. For example, square pixel N1=(C1+C4+C3+C7)/4. Rectangular pixel N8= (C1+C4)/2. It will be appreciated that following this method, every four adjacent square pixels will be assigned the same color and join to form new square pixels and every two adjacent rectangular pixels will be assigned the same color and join to form new square pixels. The resulting enhanced image will consist of three times as many pixels.

From the foregoing, those skilled in the art will appreciate that other types of image enhancement techniques may be applied in the context of the invention to provide a higher resolution image of the formation.

There have been described and illustrated herein several embodiments of methods and devices for real-time formation imaging through measurement while drilling telemetry. While particular embodiments of the invention have been described, it is not intended that the invention be limited thereto, as it is intended that the invention be as broad in scope as the art will allow and that the specification be read likewise. Thus, while particular types of sensors for sensing toolface and resistivity have been disclosed, it will be appreciated that other sensing devices could be utilized. Also, while the sensors have been shown in particular locations in the drill string, it will be recognized that the sensors may be located at different locations in the drill string without departing from the scope of the invention. Moreover, while particular methods have been disclosed in reference to synchronizing toolface and resistivity measurements, it will be appreciated that other methods could be used as well. Furthermore, while a specific method of resistivity data compression has been disclosed, it will be understood that different data compression methods can achieve the same or similar result as disclosed herein. Additionally, while a specific telemetry data frame has been disclosed, it will be appreciated that many other configurations of the data frame can achieve the results desired. In this regard, it will also be understood that the number and rate of resistivity measurements can be varied according to the drilling conditions to accommodate different drilling speeds and different telemetry rates. It will also be appreciated that the real-time resistivity data transmitted to the surface according to the invention can be used for purposes other than for forming an image of the formation. Moreover, the methods of the present invention may be applied to other types of downhole data for rapid real-time transmission to the surface using the relatively slow transmission rates imposed by MWD telemetry devices.

It will therefore be appreciated by those skilled in the art that yet other modifications could be made to the provided invention without deviating from its spirit and scope as so claimed.

I claim:

1. A method for providing, while drilling a borehole with a drilling tool, a data map of the formation surrounding the borehole in substantially real-time at the surface, said method comprising:
   a) selecting a plurality of unique toolface positions of the drilling tool;
   b) in the borehole, recording data measurements at a plurality of toolface positions;
   c) in the borehole, selecting recorded data measurements or interpolations of recorded data measurements which correspond substantially to said unique toolface positions to obtain position data measurements;
   d) in the borehole, compressing the position data measurements to obtain compressed data;
   e) in the borehole, modulating said compressed data and transmitting said modulated compressed data to the surface using measurement-while-drilling telemetry;
   f) receiving and demodulating the modulated compressed data at the surface to obtain said compressed data;
   g) obtaining distance data regarding the location of the drilling tool in the borehole;
   h) at the surface, associating indications of said compressed data with said unique toolface positions and with said distance data to obtain associations; and
   i) repeating steps b) through h), and utilizing said associations formed at step h), forming at the surface a data map of the formation surrounding the borehole, said data map being a three-dimensional map with a first dimension being a function of said distance data, a second dimension being a function of said toolface positions, and a third dimension being a function of said indications of said compressed data.

2. A method according to claim 1, further comprising:
   j) associating said indications of said compressed data with first picture elements to form an image of the formation surrounding the borehole.

3. A method according to claim 1, wherein: said data measurements are resistivity measurements, and said indications are resistivity indications.

4. A method according to claim 1, wherein:
   said recording data measurements at a plurality of toolface positions comprises the steps of
   i) determining a first toolface position,
   ii) recording sequential data measurements and sequential toolface positions at a constant predetermined rate for a constant predetermined duration, and
   iii) associating each recorded sequential data measurement with a corresponding recorded sequential toolface position.

5. A method according to claim 4, wherein:
   said selecting recorded data measurements or interpolations of recorded data measurements which correspond substantially to said unique toolface positions comprises the steps of
   i) comparing the recorded toolface positions with said plurality of unique toolface positions, and
   ii) selecting the recorded data measurements made at toolface positions which correspond to said unique toolface positions or interpolating from said recorded data measurements data measurements which correspond to said unique toolface positions.

6. A method according to claim 1, wherein:
   said recording data measurements at a plurality of toolface positions comprises the steps of
   i) determining a first toolface position, and
   ii) recording sequential data measurements at a constant predetermined rate until the first toolface position is again determined.

7. A method according to claim 6, wherein:
   said selecting recorded data measurements or interpolations of recorded data measurements which correspond substantially to said unique toolface positions comprises the steps of
   i) counting the number of recorded sequential data measurements to determine a number M;

ii) dividing the number M by the number of said unique toolface positions to determine a quotient N;

iii) selecting approximately every Nth one of the recorded sequential data measurements as being respectively associated with a corresponding one of said unique toolface positions.

8. A method according to claim 7, wherein:
said selecting approximately every Nth one includes interpolating between recorded sequential data measurements when N is not an integer.

9. A method according to claim 7, wherein:
said selecting approximately every Nth one includes selecting exactly every Nth one when N is an integer.

10. A method according to claim 4, wherein:
said constant predetermined rate is fast enough so that the number of recorded sequential data measurements is greater than or equal to the number of unique toolface positions.

11. A method according to claim 4, wherein:
said constant predetermined duration is long enough so that the number of recorded sequential toolface positions is greater than or equal to the number of unique toolface positions.

12. A method according to claim 6, wherein:
said constant predetermined rate is fast enough so that the number of recorded sequential data measurements is greater than or equal to the number of unique toolface positions.

13. A method according to claim 1, wherein:
said compressing comprises the steps of
 i) creating a plurality of scales, each scale having an identifiable value and representing a plurality of ranges, each range having an identifiable value and representing a range of data values, and
 ii) selecting a scale value and a range value for each of said position data measurements which best approximates said position data measurement.

14. A method according to claim 1, wherein:
said compressing comprises the steps of
 i) creating a plurality of scales, each scale having an identifiable value and representing a plurality of ranges, each range having an identifiable value and representing a range of data values, and
 ii) for a plurality of said position data measurements, selecting a single scale value and for each of said plurality of said position data measurements selecting a range value.

15. A method according to claim 13, wherein:
said modulating compressed data comprises the steps of
 i) modulating a first scale value corresponding to a first compressed datum and a first range value corresponding to the first compressed datum,
 ii) determining whether a next scale value corresponding to a next compressed datum is the same as the first scale value and, if so, transmitting a next range value corresponding to the next compressed datum, and
 iii) repeating step ii) until the next scale value is different from the first scale value.

16. A method according to claim 14, wherein:
said modulating compressed data comprises the steps of
 i) modulating said single scale value corresponding to said plurality of said position data measurements,
 ii) modulating each range value selected for each of said plurality of said position data measurements.

17. A method according to claim 14, wherein:
said plurality of said position data measurements represents a layer of data measurements,
said modulating said compressed data includes modulating said single scale value and modulating each range value selected for each of said plurality of said position data measurements,
steps b) through d) are completed before step e), and
step e) is completed before steps b) through d) are completed a second time.

18. A method according to claim 2, further comprising:
k) arranging said first picture elements in rows and columns, each row corresponding to a distance datum and each column corresponding to one of said unique toolface positions;

l) generating a plurality of second picture elements, each of said second picture elements being bounded by at least two of said first picture elements and being generated by averaging said at least two of said first picture elements.

19. A method according to claim 1, wherein:
said recording data measurements is performed during a recording cycle; and
said recording cycle comprises at least one rotation of the toolface of the drilling tool.

20. A method according to claim 1, wherein:
said indications of said compressed data are indications of decompressed versions of said compressed data.

21. A method according to claim 1, wherein:
said indications of said compressed data are said compressed data.

22. A method according to claim 2, wherein:
said indications of said compressed data are indications of decompressed versions of said compressed data.

23. A method according to claim 2, wherein:
said indications of said compressed data are said compressed data.

24. A method according to claim 1, wherein:
said three-dimensional map is expressed as a two-dimensional image, wherein said third dimension is expressed as one of an intensity, a color, and a number.

25. An apparatus for creating an image of a formation surrounding a borehole in substantially real-time at the surface while drilling the borehole, said apparatus comprising:
a) a downhole data sensor located at a predetermined position in a drill string;
b) downhole position means for determining at least one toolface position of said data sensor;
c) downhole synchronizing means for synchronizing data measurements with toolface positions;
d) downhole first recording means for recording a plurality of data measurements made at a plurality of toolface positions, said first recording means being coupled to said data sensor;
e) downhole compression means for compressing at least some of said data measurements, said compression means being coupled to said recording means;
f) downhole measurement-while-drilling (MWD) telemetry means for transmitting compressed data measurements to the surface without associated toolface position data;
g) surface apparatus distance measurement means for determining a location of said data sensor in the borehole;

h) surface receiving means for receiving compressed data measurements;

i) first surface means for associating at last some of said compressed data measurements with predetermined toolface positions; and j) second surface means for associating said at least some of said compressed data measurements with distance.

26. An apparatus according to claim 25, further comprising:

k) surface means for associating compressed data measurements with first picture elements; and l) surface means for arranging said first picture elements according to depth and toolface positions.

27. An apparatus according to claim 25, wherein:

said downhole data sensor is a resistivity sensor, and said compressed data measurements are compressed resistivity measurements.

28. An apparatus according to claim 25, wherein:

said downhole synchronizing means includes i) signalling means for signalling a first toolface position to said first recording means, and ii) clock means for determining when data measurements are recorded, said clock means coupled to said first recording means, such that upon receiving a signal from said signalling means, said first recording means records a plurality of data measurements at a predetermined rate.

29. An apparatus according to claim 28, wherein:

said first recording means continues to record data measurements until said signalling means signals said first toolface position, such that said plurality of data measurements represent one rotation of the toolface.

30. An apparatus according to claim 29, wherein:

said downhole synchronizing means further includes iii) selection means for selecting among said plurality of data measurements a predetermined number of data measurements corresponding to said predetermined toolface positions.

31. An apparatus according to claim 30, wherein:

said downhole synchronizing means further includes iv) interpolation means for interpolating between a pair of said plurality of data measurements a data measurement which corresponds to one of said predetermined toolface positions.

32. An apparatus according to claim 25, wherein:

said downhole synchronizing means includes i) second recording means for recording toolface positions, said second recording means being coupled to said position means, ii) first clock means for determining when data measurements are recorded, said first clock means coupled to said first recording means, iii) second clock means for determining when toolface positions are recorded, said second clock means coupled to said second recording means, and iv) signalling means for starting recording, said signalling means being coupled to said first and second recording means, such that upon receiving a signal from said signalling means, said first recording means records a predetermined number of data measurements at a predetermined rate and said second recording means records a same predetermined number of toolface positions at a same predetermined rate.

33. An apparatus according to claim 32, wherein:

said downhole synchronizing means further includes v) association means for associating each of said predetermined number of data measurements with a corresponding one of said same predetermined number of toolface positions.

34. An apparatus according to claim 33, wherein:

said downhole synchronizing means further includes vi) selection means for selecting among said predetermined number of data measurements, data measurements corresponding to said predetermined toolface positions.

35. An apparatus according to claim 34, wherein:

said downhole synchronizing means further includes vii) interpolation means for interpolating between a pair of said predetermined number of data measurements, a data measurement which corresponds to one of said predetermined toolface positions.

36. An apparatus according to claim 25, wherein:

said downhole compression means includes i) memory means storing a plurality of scales, each scale having an identifiable value and representing a plurality of ranges, each range having an identifiable value and representing a range of data values, and ii) means for selecting a corresponding scale value and range value for at least some of said data measurements.

37. An apparatus according to claim 25, wherein:

said downhole compression means includes i) memory means storing a plurality of scales, each scale having an identifiable value and representing a plurality of ranges, each range having an identifiable value and representing a range of data values, and ii) means for selecting a corresponding scale value for a plurality of said data measurements and a corresponding range value for each of said plurality of said data measurements.

38. An apparatus according to claim 37, wherein:

said MWD telemetry means includes means for transmitting said scale value for a plurality of said data measurements and transmitting in sequence said range value for each of said plurality of said data measurements.

39. An apparatus according to claim 26, further comprising:

m) means for generating a plurality of second picture elements, each of said second picture elements being bounded by at least two of said first picture elements and being generated by averaging said at least two of said first picture elements.

40. A method for associating data measurements with a first number of predetermined sequential toolface positions in a measurement while drilling tool during the drilling of a wellbore, said method comprising:

a) determining a first toolface position;

b) recording sequential data measurements at a constant predetermined rate until the first toolface position is again determined;

c) counting the number of recorded sequential data measurements to determine a number M;

d) dividing the number M by the first number of predetermined sequential toolface positions to determine a quotient N which is substantially greater than one:

e) selecting approximately every Nth one of the sequential data measurements recorded as being respectively associated with a corresponding one of the first number of predetermined sequential toolface positions.

41. A method according to claim 40, wherein:

said selecting approximately every Nth one includes interpolating between sequential data measurements when N is not an integer.

42. A method according to claim 40, wherein:

said selecting approximately every Nth one includes selecting exactly every Nth one when N is an integer.

43. A method according to claim 40, wherein:

said constant predetermined rate is fast enough so that the number of recorded sequential data measurements is substantially greater than the first number of predetermined sequential toolface positions.

44. A method for associating data measurements with a first number of predetermined sequential toolface positions in a measurement while drilling tool during the drilling of a wellbore, said method comprising:

a) determining a first toolface position;

b) recording sequential data measurements and toolface positions at a constant predetermined rate for a constant predetermined time, such that said recorded toolface positions number substantially more than said first number of predetermined sequential toolface positions;

c) associating each recorded data measurement with a corresponding recorded toolface position;

d) comparing the recorded toolface positions with the predetermined toolface positions; and e) selecting the recorded data measurements which are associated with recorded toolface positions corresponding to predetermined toolface positions.

45. A method according to claim 44, wherein:

said constant predetermined rate is fast enough so that the number of recorded sequential data measurements is substantially greater than the first number of predetermined sequential toolface positions.

46. A method according to claim 44, wherein:

said constant predetermined time is long enough so that the number of recorded sequential toolface positions is substantially greater than the first number of predetermined sequential toolface positions.

47. A method according to claim 44, further comprising:

f) interpolating between a pair of the recorded data measurements which are associated with recorded toolface positions which do not correspond to predetermined toolface positions to obtain an interpolated data measurement which corresponds to a predetermined toolface position.

* * * * *